United States Patent
Dong et al.

(10) Patent No.: US 12,253,392 B2
(45) Date of Patent: Mar. 18, 2025

(54) MICRO-PROBE LASER FREQUENCY MODULATION INTERFEROMETRIC RANGING METHOD AND SYSTEM

(71) Applicant: Harbin Institute of Technology, Harbin (CN)

(72) Inventors: Yisi Dong, Harbin (CN); Wenrui Luo, Harbin (CN); Wenwen Li, Harbin (CN); Chen Zhang, Harbin (CN); Jinran Zhang, Harbin (CN); Pengcheng Hu, Harbin (CN)

(73) Assignee: Harbin Institute of Technology, Harbin (CN)

( * ) Notice: Subject to any disclaimer, the term of this patent is extended or adjusted under 35 U.S.C. 154(b) by 0 days.

(21) Appl. No.: 18/744,803

(22) Filed: Jun. 17, 2024

(65) Prior Publication Data

US 2025/0044128 A1 Feb. 6, 2025

(30) Foreign Application Priority Data

Aug. 2, 2023 (CN) .......................... 202310968558.8

(51) Int. Cl.
*G01D 5/353* (2006.01)
(52) U.S. Cl.
CPC ................................ *G01D 5/35306* (2013.01)
(58) Field of Classification Search
CPC ................................................ G01D 5/35306
See application file for complete search history.

(56) References Cited

U.S. PATENT DOCUMENTS 9,829,306 B2 * 11/2017 Thurner ............. G01B 9/02007

OTHER PUBLICATIONS

Shuwang Li, Shiyong Shao, Haiping Mei, Ruizhong Rao, "Aerosol absorption measurement with a sinusoidal phase modulating fiber optic photo thermal interferometer," Proc. SPIE 10156, Hyperspectral Remote Sensing Applications and Environmental Monitoring and Safety Testing Technology, 101561A (Year: 2016).*
CNIPA, Notification of First Office Action for CN202310968558.8, Feb. 3, 2024.

(Continued)

*Primary Examiner* — Uzma Alam
*Assistant Examiner* — Adrian Ignacio Silva
(74) *Attorney, Agent, or Firm* — Hemisphere Law, PLLC; Zhigang Ma

(57) ABSTRACT

A micro-probe laser frequency modulation interferometric ranging method and system, under the premise of not introducing an absolute laser rangefinder to introduce new uncertainties, continuously and slowly changes the modulated laser wavelength, resulting in a continuous periodic phase change in the interference signal obtained by the detector. The laser modulation absorption spectrum shifts from the initial locked absorption peak to another locked peak, and the wavelength changes of the two locked absorption peaks before and after are obtained by checking the table. Meanwhile, calculating the phase difference demodulated by the phase generated carrier (PGC) before and after, and the initial length of optical dead-path is calculated using wavelength scanning technology. Afterwards, utilizing the advantages of high relative distance measurement accuracy of micro-probe fiber optic laser interferometer, real-time measurement of the measured distance is achieved.

8 Claims, 1 Drawing Sheet

(56) References Cited

OTHER PUBLICATIONS

Harbin Institute of Technology (Applicant), Claims (allowed) CN202310968558.8, Mar. 11, 2024.
CNIPA, Notification to grant patent right for invention in CN202310968558.8, Mar. 21, 2024.

* cited by examiner

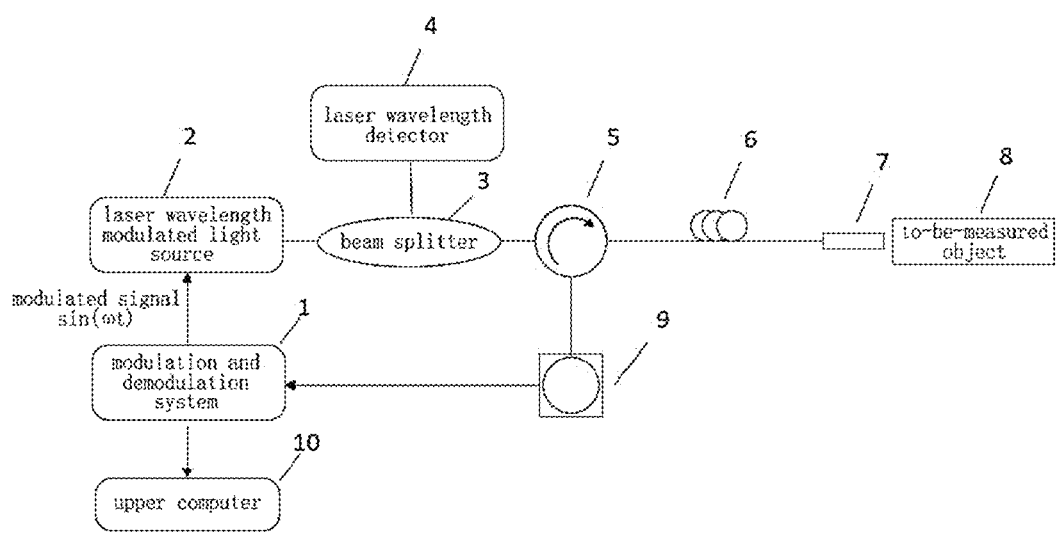

MICRO-PROBE LASER FREQUENCY MODULATION INTERFEROMETRIC RANGING METHOD AND SYSTEM

CROSS REFERENCE TO RELATED APPLICATION

This application claims priority to Chinese Patent Application No. 202310968558.8, filed Aug. 2, 2023, which is herein incorporated by reference in its entirety.

TECHNICAL FIELD

The disclosure relates to the field of fiber optic interference measurement technologies, and particularly to a micro-probe laser frequency modulation interferometric ranging method and system.

BACKGROUND

With the improvement of a series of key technologies such as optical components, optical systems and high-speed signal processing in China, the proportion of laser ranging technology using interferometry is increasing day by day in the field of laser ranging. The laser wavelength used in interferometric ranging systems is short and has good monochromaticity and high wavelength accuracy. The high accuracy of the laser ranging technology using the interferometry is incomparable to methods such as pulse laser ranging, triangular laser ranging and phase laser ranging. Compared with traditional laser interferometers, micro-probe fiber optic laser interferometers have advantages of small volume, less susceptibility to thermal pollution, fewer mechanical drift factors, ability of completing measurement in narrow spaces such as cutting-edge equipment and others.

In the related art, a micro-probe fiber optic laser interferometer includes: a laser wavelength modulated light source, a fiber optic jumper, a fiber optic sensing probe, a laser wavelength detection instrument, a beam splitter, a fiber optic circulator, a fiber optic collimator, a photodetector, and a modulation and demodulation system. The laser wavelength modulated light source is used to perform sinusoidal modulation on a laser wavelength, and output a laser used for interferometric measurement connected to the fiber optic sensing probe by the fiber optic jumper; and the zero-angle light-emitting end surface of the fiber optic jumper defines a Fabry-Parrot cavity with a surface of a to-be-measured object; the beam splitter is used to divide the laser outputted from the laser wavelength modulated light source into two beams, one of the two beams is used for interferometric measurement and the other beam is used for laser wavelength detection; the photodetector is capable of detecting interference signals, and the interference signal is formed by the interference of a laser emitted from the fiber optic sensing probe and reflected by the to-be-measured object into the probe; the modulation and demodulation system is coupled to the photodetector. The micro-probe fiber optic laser interferometer compared to other laser interferometers built with prisms inside, is more easily applied to embedded ranging in various narrow spaces due to the advantages of small measurement space requirements, simple structure, fewer mechanical drift factors, and strong environmental adaptability. Laser interferometers have the advantage of high relative distance measurement accuracy. However, in practical applications, it is necessary to use absolute laser rangefinders or other instruments for measuring absolute distance to measure the initial dead-path length. The system is complex, and the uncertainty of the optical dead-path measurement system is not high. Therefore, the existence of optical dead-path has always been a key issue for laser interferometers to achieve high-precision ranging.

Due to the characteristics of dual beam interference, a relative displacement can be calculated based on the demodulated phase. However, to solve the actual distance, the length of optical dead-path also needs to be calculated. Currently, manual measurement methods are generally used for dead-path length measurement, and the measurement accuracy is not high, usually only reaching the millimeter order. In addition, absolute laser rangefinders can also be used to measure the length of the dead-path, but the measurement structure of the absolute laser rangefinder is more complex. The output optical path of the newly introduced laser rangefinder is difficult to completely coincide with the actual interferometric measurement optical path, so the uncertainty of the system measurement can only reach the millimeter order.

In 2008, Yang Hongxing, Tan Jiubin, and others proposed a measurement method for dead-path length based on absolute laser rangefinder, polarization rotator, and polarizer (Yang Hongxing, Tan Jiubin, Hu Pengcheng, Fu Haijin, Automatic real-time compensation of vacant band error based on monitor the laser heterodyne interferometry timely, Optoelectronics and Laser, 2008 (07): 934-937.) However, the disadvantage of this method is that each time the interferometer is reset, operator need to manually measure the difference in length between the measurement optical path and the reference optical path, which is the dead-path length. Then the dead-path length is inputted into a software for compensation. Further, the system structure is complex, requiring the use of additional absolute laser rangefinder. The output optical path of the laser rangefinder is also difficult to completely coincide with the actual interferometric measurement optical path, and it is relatively cumbersome and difficult to measure the length of dead-path in some application scenarios.

In 2022, Bai yang, Lu Yunfeng, and others proposed an optical dead-path length measurement method based on vacuum/air environment optical path difference measurement using joule balance to interfere optical path. (Bai yang, Lu Yunfeng, Liao Fujian, Wang Yue, Li Zhengkun, Research on Dead-Path Measurement in Interferometer System of Joule Balance, Metrology Science and Technology, 2022, 66 (04): 34-39.) However, this method requires the use of the vacuum system of the joule balance to change the air refractive index of the optical dead-path. The method utilizes the change in air refractive index to change the optical path variation during the measurement process, and then measure the optical dead-path length. Therefore, this method can only be used for the measurement of displacement and precision positioning of moving coils in joule balance systems and is not widely used.

In summary, there is currently a lack of a simple, fast, and efficient laser interferometric ranging method without introducing additional uncertainty factors in the field of fiber optic sensing measurement and detection.

SUMMARY

In order to solve the above-mentioned technical problems, the disclosure provides a micro-probe laser frequency modulation interferometric ranging method and system to solve the problems in the related art. To achieve the above objectives, the technical solutions adopted by the disclosure are as follows.

A micro-probe laser frequency modulation interferometric ranging method, including following steps S1-S9:

S1, activating a laser wavelength modulated light source; and outputting, by the laser wavelength modulated light source, a laser to an input port of a beam splitter;

S2, outputting, by a second output port of the beam splitter, a part of the laser to a laser wavelength detector; and outputting, by a first output port of the beam splitter, another part of the laser to a first port of a fiber optic circulator;

S3, outputting, by a second port of the fiber optic circulator, the another part of the laser as an output laser to a fiber optic jumper, thereby making a fiber optic end surface of the fiber optic jumper reflect a part of the output laser to obtain a first reflected light (also referred to as first reflected laser) and making the fiber optic jumper transmit another part of the output laser to a to-be-measured object; receiving, by the to-be-measured object, the another part of the output laser to cause interference on a surface of the to-be-measured object and generate a second reflected light (also referred to as second reflected laser) which is returned and coupled to the fiber optic jumper; and generating, by interference of the first reflected light and the second reflected light, an interferometric measurement signal in the fiber optic jumper;

S4, outputting, by the fiber optic jumper, the interferometric measurement signal to the second port of the fiber optic circulator; and outputting, by a third port of the fiber optic circulator, the interferometric measurement signal to a photodetector;

S5, converting, by the photodetector, the interferometric measurement signal into an electrical signal; and inputting, by the photodetector, the electrical signal to a modulation and demodulation system;

S6, obtaining, by the laser wavelength detector, a locked acetylene gas absorption peak $P_x$; recording a laser wavelength $\lambda_1$ corresponding to the locked acetylene gas absorption peak $P_x$ by looking up a table; collecting, by the modulation and demodulation system, the electrical signal from the photodetector to perform phase generated carrier (PGC) demodulation to obtain current phase information $\varphi_1$; and transmitting, by the modulation and demodulation system, the current phase information $\varphi_1$ to an upper computer to be recorded;

S7, recording, by the upper computer, a demodulation phase output value $\varphi(t)$ continuously by continuously changing a wavelength of the laser outputted from the laser wavelength modulated light source until a modulation absorption spectroscopy of the laser wavelength modulated light source is locked to another locked acetylene gas absorption peak $P_y$; recording, by the upper computer, a laser wavelength $\lambda_2$ corresponded to the another locked acetylene gas absorption peak $P_y$ by looking up the table; and recording, by the upper computer, a current PGC demodulation phase $\varphi_2$;

S8, calculating to obtain an initial dead-path distance $L_0$ based on recorded parameters; and S9, measuring, by a fiber optic sensing probe, a relative displacement $L(t)$, and expressing a distance L between the to-be-measured object and a micro-probe fiber optic laser interferometer as follows:

$$L=L_0+L(t).$$

In an embodiment, in the S8, the initial dead-path distance $L_0$ is calculated by below formula:

$$L_0 = \frac{\Delta\varphi(t) \cdot \lambda_1 \lambda_2}{4\pi n_{air} \cdot (\lambda_1 - \lambda_2)},$$

where $n_{air}$ represents a refractive index of air in a measurement environment, and $\Delta\varphi(t)$ represents a phase variation.

In an embodiment, a zero-angle light-emitting end surface of the fiber optic jumper and a surface of the to-be-measured object together define a Fabry-Pérot cavity (also referred to as plane-parallel cavity), and the photodetector is configured to detect an interference signal formed by beam interference in the Fabry-Pérot cavity.

In an embodiment, the electrical signal outputted from the photodetector in the S6 is expressed as follows:

$$i_m = A+B \cos[C \cos(\omega_0 t)+\varphi(t)],$$

where $i_m$ represents the electrical signal, C represents a phase modulation depth, $\omega_0$ represents a modulation signal frequency, $\varphi(t)$ represents a modulated phase of light source, and $A=k(I_1+I_2)$ and $B=2k\sqrt{I_1 I_2}$, $I_1$ and $I_2$ represent two intensities of the first reflected light and the second reflected light, and k represents a conversion coefficient of the photodetector.

In addition, a micro-probe laser frequency modulation interferometric ranging system is provided to implement the above micro-probe laser frequency modulation interferometric ranging method, the micro-probe laser frequency modulation interferometric ranging system includes: the modulation and demodulation system, the laser wavelength modulated light source, the beam splitter, the laser wavelength detector, the fiber optic circulator, the fiber optic jumper, the upper computer and the photodetector;

two output ports of the modulation and demodulation system are respectively connected to the laser wavelength modulated light source and the upper computer;

an output port of the laser wavelength modulated light source is connected to the input port of the beam splitter; the first output port of the beam splitter is connected to the first port of the fiber optic circulator, and the second output port of the beam splitter is connected to the laser wavelength detector;

the second port of the fiber optic circulator is connected to the fiber optic jumper; the third port of the fiber optic circulator is connected to an input port of the photodetector, and an output port of the photodetector is connected to an input port of the modulation and demodulation system.

In an embodiment, the micro-probe laser frequency modulation interferometric ranging system further includes a fiber optic collimator disposed at an output port of the fiber optic jumper.

In an embodiment, the fiber optic jumper and the fiber optic collimator together define the fiber optic sensing probe.

In an embodiment, the modulation and demodulation system, the laser wavelength modulated light source, the laser wavelength detector and the fiber optic sensing probe jointly define the micro-probe fiber optic laser interferometer.

The disclosure has the following beneficial effects: the technical solutions of the disclosure utilize the characteristics of a tunable laser source (i.e., the laser wavelength modulated light source) in the micro-probe fiber optic laser interferometer, inherit the advantages of high accuracy of laser ranging and overcome the disadvantages of only measuring the relative distance and not being able to measure the initial length of dead-path (i.e., initial dead-path length or initial dead-path distance). The disclosure does not require increasing the complexity of an optical path, only adds a device for measuring wavelength in the interference, showing significant technical advantages in the field of precision measurement.

BRIEF DESCRIPTION OF DRAWING

FIGURE illustrates a schematic structural diagram of a micro-probe laser frequency modulation interferometric ranging system provided by the disclosure;

Description of reference numerals: 1: modulation and demodulation system; 2: laser wavelength modulated light source; 3: beam splitter; 4: laser wavelength detector; 5: fiber optic circulator; 6: fiber optic jumper; 7: fiber optic collimator; 8: to-be-measured object; 9: photodetector; 10: upper computer.

DETAILED DESCRIPTION OF EMBODIMENTS

Technical solutions in embodiments of the disclosure will be clearly and completely described in conjunction with FIGURE. Apparently, the described embodiments are only a part of the embodiments of the disclosure, not all of them. If not specifically specified, technical means used in the embodiments of the disclosure are conventional means well-known to those skilled in the art.

The disclosure proposes and develops a micro-probe laser frequency modulation interferometric ranging method and system. The disclosure requires no use of an absolute laser rangefinder or other instruments for measuring absolute distance to measure an initial length of dead-path (i.e., initial dead-path length or initial dead-path distance). By using a modulation absorption frequency stabilization technology of a laser wavelength modulated light source in a micro-probe fiber optic laser interferometer, a laser wavelength outputted from the micro-probe fiber optic laser interferometer is changed continuously to produce a continuous change of a phase demodulated by a signal demodulation unit. When an external reference frequency moves from an initial locked absorption peak to another locked absorption peak, a variation of the phase is recorded. The initial length of dead-path (i.e., initial dead-path length or initial dead-path distance) is calculated by a measurement distance formula of a wavelength scanning interferometry measurement technology. A to-be-measured object 8 moves, and the micro-probe fiber optic laser interferometer measures a relative displacement. An actual distance between the to-be-measured object 8 and the micro-probe fiber optic laser interferometer is obtained by adding up the initial length of dead-path (i.e., initial dead-path length or initial dead-path distance) and the relative displacement length.

The micro-probe laser frequency modulation interferometric ranging method includes following steps S1-S9.

In S1, a laser wavelength modulated light source 2 is activated; and a modulation unit of a modulation and demodulation system 1 generates a sine wave that is fed to the laser wavelength modulated light source 2, so that a wavelength of a laser outputted from the laser wavelength modulated light source 2 is sinusoidally modulated. The laser wavelength modulated light source 2 output the laser to the input port of a beam splitter 3.

In S2, the second output port of the beam splitter 3 outputs a part of the laser to the laser wavelength detector 4. The first output port of the beam splitter 3 outputs another part of the laser to the first port of a fiber optic circulator 5.

In S3, a second port of the fiber optic circulator 5 output the another part of the laser as an output laser to the fiber optic jumper 6. A part of the output laser is reflected on the fiber end surface of the fiber optic jumper 6 to generate a first reflected light. Another part of the output laser is transmitted to a to-be-measured object 8, causing interference on the surface of the to-be-measured object 8 and generating a second reflected light that returns and couples to the fiber optic jumper 6. An interferometric measurement signal is formed in the fiber optic jumper 6 through interference of the first reflected light and the second reflected light.

In S4, the interferometric measurement signal enters the second port of the fiber optic circulator 5 and exits from a third port of the fiber optic circulator 5 to a photodetector 9.

In S5, the photodetector 9 converts the interferometric measurement signal into an electrical signal, which is inputted into the modulation and demodulation system 1 to be processed, and the modulation and demodulation system 1 processes the electrical signal to obtain two interference signals $U_{m1}$ and $U_{m2}$.

In S6, a laser wavelength detector 4 is turned on to detect the output laser wavelength. After stabilizing the frequency of the output laser by using modulated absorption spectroscopy, the laser wavelength detector 4 obtains a locked acetylene gas absorption peak $P_x$. Checking a table and recording a laser wavelength $\lambda_1$ corresponding to the locked acetylene gas absorption peak $P_x$. The modulation and demodulation system 1 collects the electrical signal from the photodetector 9 and performs phase generated carrier (PGC) demodulation on the electrical signal to obtain current phase information $\varphi_1$, and the current phase information $\varphi_1$ is transmitted to an upper computer 10 to be recorded.

Specifically, the modulation absorption spectroscopy technology is the prior art for laser frequency stabilization. In order to ensure the stability of the laser output wavelength at each wavelength, the modulation absorption spectroscopy technology is needed for frequency stabilization.

In S7, the upper computer 10 continuously records the demodulation phase output value $\varphi(t)$ by continuously and slowly changing an output wavelength of the laser wavelength modulated light source 2 until the modulation absorption spectroscopy of the laser wavelength modulated light source 2 is locked to another locked acetylene gas absorption peak $P_y$. The upper computer 10 records a laser wavelength $\lambda_2$ corresponded to the another locked acetylene gas absorption peak $P_y$ by looking up the table and records a current PGC demodulation phase $\varphi_2$.

In S8, an initial dead-path distance $L_0$ is obtained by calculating based on recorded parameters (e.g., including the laser wavelength $\lambda_1$, the laser wavelength $\lambda_2$, the current phase information $\varphi_1$ and the current PGC demodulation phase $P_2$).

In S9, a fiber optic sensing probe measures a relative displacement $L(t)$ when the to-be-measured object 8 is moved, and a distance L between the to-be-measured object 8 and a micro-probe fiber optic laser interferometer is expressed as follows:

$$L = L_0 + L(t).$$

In an embodiment, in the S8, the initial dead-path distance $L_0$ is calculated by the below formula:

$$L_0 = \frac{c}{4\pi n_{air}} \frac{\Delta\varphi(t)}{\Delta v} = \frac{\Delta\varphi(t) \cdot \lambda_1 \lambda_2}{4\pi n_{air} \Delta\lambda} = \frac{\Delta\varphi(t) \cdot \lambda_1 \lambda_2}{4\pi n_{air} \cdot (\lambda_1 - \lambda_2)},$$

where c represents speed of light in a vacuum, $n_{air}$ represents a refractive index of air in a measurement environment, $\Delta v$ represents a laser frequency variation, $\Delta\lambda$ represents a wavelength variation, $\Delta\lambda=\lambda_1-\lambda_2$ and $\Delta\varphi(t)$ represents a phase variation.

Furthermore, as long as the $\Delta\varphi(t)$ and $\Delta v$ (or wavelength variation $\Delta\lambda$) are determined, the measured distance can be calculated:

$$\varphi_2(t) - \varphi_1(t) = \frac{4\pi n_{air} L_0}{\lambda_2} - \frac{4\pi n_{air} L_0}{\lambda_1} = 4\pi n_{air} L_0 \left(\frac{1}{\lambda_2} - \frac{1}{\lambda_1}\right),$$

i.e., $$\Delta\varphi(t) = 4\pi n_{air} L_0 \cdot \frac{\lambda_1 - \lambda_2}{\lambda_1 \lambda_2};$$

and
what can be concluded by changing is:

$$L_0 = \frac{\Delta\varphi(t) \cdot \lambda_1 \lambda_2}{4\pi n_{air} \cdot (\lambda_1 - \lambda_2)},$$

when the refractive index of the air in the measurement environment $n_{air}$ is approximate to 1 and the $\Delta\lambda$ is very small, the formula can be approximated as follows:

$$L_0 = \frac{\lambda^2(\varphi_2 - \varphi_1)}{4\pi(\lambda_1 - \lambda_2)}.$$

In an embodiment, a zero-angle light-emitting end surface of the fiber optic jumper 6 and a surface of the to-be-measured object 8 together define a Fabry-Pérot cavity, and the photodetector 9 is configured to detect an interference signal formed by beam interference in the Fabry-Pérot cavity.

In an embodiment, the electrical signal outputted from the photodetector 9 in the S6 is expressed as follows:

$i_m = A + B \cos[C \cos(\omega_0 t) + \varphi(t)]$, where $i_m$ represents the electrical signal, C represents a depth of phase modulation, we represents a modulation signal frequency, $\varphi(t)$ represents a modulated phase of light source, and $A=k(I_1+I_2)$ and $B=2k\sqrt{I_1 I_2}$. $I_1$ and $I_2$ represent two intensities of the first reflected light and the second reflected light, and k represents a conversion coefficient of the photodetector 9.

A micro-probe laser frequency modulation interferometric ranging system, includes: the modulation and demodulation system 1, the laser wavelength modulated light source 2, the beam splitter 3, the laser wavelength detector 4, the fiber optic circulator 5, the fiber optic jumper 6, the upper computer 10 and the photodetector 9.

Two output ports of the modulation and demodulation system 1 are respectively connected to the laser wavelength modulated light source 2 and the upper computer 10.

An output port of the laser wavelength modulated light source 2 is connected to the input port of the beam splitter 3. The first output port of the beam splitter 3 is connected to the first port of the fiber optic circulator 5, and the second output port of the beam splitter 3 is connected to the laser wavelength detector 4.

The second port of the fiber optic circulator 5 is connected to the fiber optic jumper 6. The third port of the fiber optic circulator 5 is connected to an input port of the photodetector 9, and an output port of the photodetector 9 is connected to an input port of the modulation and demodulation system 1.

In an embodiment, the micro-probe laser frequency modulation interferometric ranging system further includes a fiber optic collimator 7 disposed at an output port of the fiber optic jumper 6.

In an embodiment, the fiber optic jumper 6 and the fiber optic collimator 7 together define the fiber optic sensing probe.

In an embodiment, the modulation and demodulation system 1, the laser wavelength modulated light source 2, the laser wavelength detector 4 and the fiber optic sensing probe jointly define the micro-probe fiber optic laser interferometer.

The advantage of disclosure is that, compared to manual measurement of optical dead-path and measurement methods based on an absolute laser rangefinder or other instruments measuring absolute distance for measuring the initial length of dead-path (i.e., initial dead-path length or initial dead-path distance), the method can produce a continuously change of the phase demodulated by the signal demodulation unit by continuously changing the output laser wavelength under the premise of not introducing additional ranging equipment to introduce new uncertainties. When the external reference frequency moves from the initial locked absorption peak to another locked absorption peak, the change of the phase is recorded. The initial length of dead-path is calculated by the measurement distance formula of the wavelength scanning interferometry measurement technology. The to-be-measured object 8 moves, and the relative displacement is measured by the micro-probe fiber optic laser interferometer. The actual distance between the to-be-measured object 8 and the micro-probe fiber optic laser interferometer is obtained by adding up the initial length of dead-path and the relative displacement length, improving measurement accuracy. The technical solutions of the disclosure utilize the characteristics of the laser wavelength modulated light source in the micro-probe fiber optic laser interferometer, inherit the advantage of high accuracy of laser ranging and overcome the disadvantages of only measuring the relative distance and not being able to measure the initial length of dead-path. The disclosure does not require increasing the complexity of an optical path, only adds a device for measuring wavelength in the interference, showing significant technical advantages in the field of precision measurement.

The above embodiments are only descriptions of the preferred embodiments of the disclosure and do not limit the scope of the disclosure. Without departing from the design spirit of the disclosure, all variations, modifications, and replacements made by those skilled in the art to the technical solution of the disclosure should fall within the scope of protection determined in the claims of the disclosure.

What is claimed is:

1. A micro-probe laser frequency modulation interferometric ranging method, comprising:
   S1, activating a laser wavelength modulated light source (2); and outputting, by the laser wavelength modulated light source (2), a laser to an input port of a beam splitter (3);
   S2, outputting, by a second output port of the beam splitter (3), a part of the laser to a laser wavelength detector (4); and outputting, by a first output port of the beam splitter (3), another part of the laser to a first port of a fiber optic circulator (5);

S3, outputting, by a second port of the fiber optic circulator (5), the another part of the laser as an output laser to a fiber optic jumper (6), thereby making a fiber optic end surface of the fiber optic jumper (6) reflect a part of the output laser to obtain a first reflected light and making the fiber optic jumper (6) transmit another part of the output laser to a to-be-measured object (8); receiving, by the to-be-measured object (8), the another part of the output laser to reflect from a surface of the to-be-measured object (8) and generate a second reflected light which is returned and coupled to the fiber optic jumper (6); and generating, by interference of the first reflected light and the second reflected light, an interferometric measurement signal in the fiber optic jumper (6);

S4, outputting, by the fiber optic jumper (6), the interferometric measurement signal to the second port of the fiber optic circulator (5); and outputting, by a third port of the fiber optic circulator (5), the interferometric measurement signal to a photodetector (9);

S5, converting, by the photodetector (9), the interferometric measurement signal into an electrical signal; and inputting, by the photodetector (9), the electrical signal to a modulation and demodulation system (1);

S6, obtaining, by the laser wavelength detector (4), a locked acetylene gas absorption peak $P_x$; recording a laser wavelength $\lambda_1$ corresponding to the locked acetylene gas absorption peak $P_x$ by looking up a table; collecting, by the modulation and demodulation system (1), the electrical signal from the photodetector (9) to perform phase generated carrier (PGC) demodulation to obtain current phase information $\varphi_1$; and transmitting, by the modulation and demodulation system (1), the current phase information $\varphi_1$ to an upper computer (10) to be recorded;

S7, recording, by the upper computer (10), a demodulation phase output value $\varphi(t)$ continuously by continuously changing a wavelength of the laser outputted from the laser wavelength modulated light source until a modulation absorption wavelength of the laser wavelength modulated light source (2) is locked to another locked acetylene gas absorption peak $P_y$; recording, by the upper computer (10), a laser wavelength $\lambda_2$ corresponded to the another locked acetylene gas absorption peak $P_y$ by looking up the table; and recording, by the upper computer (10), a current PGC demodulation phase $\varphi_2$;

S8, calculating to obtain an initial dead-path distance $L_0$ based on recorded parameters; and S9, measuring, by a fiber optic sensing probe, a relative displacement L(t), and expressing a distance L between the to-be-measured object (8) and a micro-probe fiber optic laser interferometer as follows:

$$L = L_0 + L(t).$$

2. The micro-probe laser frequency modulation interferometric ranging method as claimed in claim 1, wherein in S8, the initial dead-path distance $L_0$ is calculated by the below formula:

$$L_0 = \frac{\Delta\varphi(t) \cdot \lambda_1 \lambda_2}{4\pi n_{air} \cdot (\lambda_1 - \lambda_2)},$$

where $n_{air}$ represents a refractive index of air in a measurement environment, and $\Delta\varphi(t)$ represents a phase variation.

3. The micro-probe laser frequency modulation interferometric ranging method as claimed in claim 1, wherein a zero-angle light-emitting end surface of the fiber optic jumper (6) and a surface of the to-be-measured object (8) together define a plane-parallel cavity, and the photodetector (9) is configured to detect an interference signal formed by beam interference in the plane-parallel cavity.

4. The micro-probe laser frequency modulation interferometric ranging method as claimed in claim 1, wherein the electrical signal outputted from the photodetector (9) in S6 is expressed as follows:

$$i_m = A + B \cos[C \cos(\omega_0 t) + \varphi(t)],$$

where $i_m$ represents the electrical signal, C represents a phase modulation depth, $\omega_0$ represents a modulation signal frequency, $\varphi(t)$ represents a modulated phase of the light source, and $A = k(I_1 + I_2)$ and $B = 2k\sqrt{I_1 I_2}$; $I_1$ and $I_2$ represent two intensities of the first reflected light and the second reflected light, and k represents a conversion coefficient of the photodetector (9).

5. A micro-probe laser frequency modulation interferometric ranging system, adopting the micro-probe laser frequency modulation interferometric ranging method as claimed in claim 1, comprising: the modulation and demodulation system (1), the laser wavelength modulated light source (2), the beam splitter (3), the laser wavelength detector (4), the fiber optic circulator (5), the fiber optic jumper (6), the upper computer (10) and the photodetector (9);

wherein two output ports of the modulation and demodulation system (1) are respectively connected to the laser wavelength modulated light source (2) and the upper computer (10);

an output port of the laser wavelength modulated light source (2) is connected to the input port of the beam splitter (3); the first output port of the beam splitter (3) is connected to the first port of the fiber optic circulator (5), and the second output port of the beam splitter (3) is connected to the laser wavelength detector (4); and the second port of the fiber optic circulator (5) is connected to the fiber optic jumper (6); the third port of the fiber optic circulator (5) is connected to an input port of the photodetector (9), and an output port of the photodetector (9) is connected to an input port of the modulation and demodulation system (1).

6. The micro-probe laser frequency modulation interferometric ranging system as claimed in claim 5, further comprising: a fiber optic collimator (7) disposed at an output port of the fiber optic jumper (6).

7. The micro-probe laser frequency modulation interferometric ranging system as claimed in claim 6, wherein the fiber optic jumper (6) and the fiber optic collimator (7) together define the fiber optic sensing probe.

8. The micro-probe laser frequency modulation interferometric ranging system as claimed in claim 7, wherein the modulation and demodulation system (1), the laser wavelength modulated light source (2), the laser wavelength detector (4) and the fiber optic sensing probe jointly define the micro-probe fiber optic laser interferometer.

* * * * *